No. 715,113. Patented Dec. 2, 1902.
J. MITCHELL & S. W. VAUGHEN.
BALANCED VALVE.
(Application filed Jan. 4, 1902.)

(No Model.) 2 Sheets—Sheet 1.

Witnesses
R. A. Boswell.
George M. Anderson

Inventors
James Mitchell,
Samuel W. Vaughen
By E. W. Anderson
their Attorney

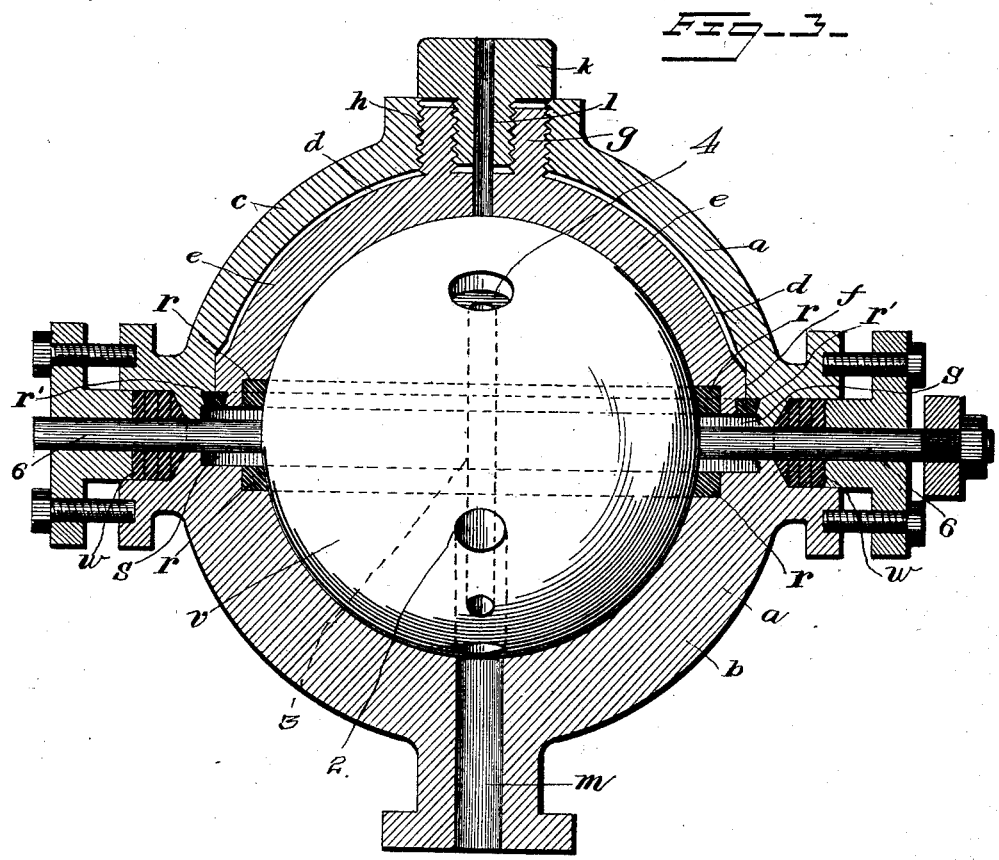

UNITED STATES PATENT OFFICE.

JAMES MITCHELL AND SAMUEL W. VAUGHEN, OF LORAIN, OHIO.

BALANCED VALVE.

SPECIFICATION forming part of Letters Patent No. 715,113, dated December 2, 1902.

Application filed January 4, 1902. Serial No. 88,388. (No model.)

*To all whom it may concern:*

Be it known that we, JAMES MITCHELL and SAMUEL W. VAUGHEN, citizens of the United States, and residents of Lorain, in the county of Lorain and State of Ohio, have made a certain new and useful Invention in Balanced Valves; and we declare the following to be a full, clear, and exact description of the same, such as will enable others skilled in the art to which it appertains to make and use the invention, reference being had to the accompanying drawings, and to letters and figures of reference marked thereon, which form a part of this specification.

Figure 1:
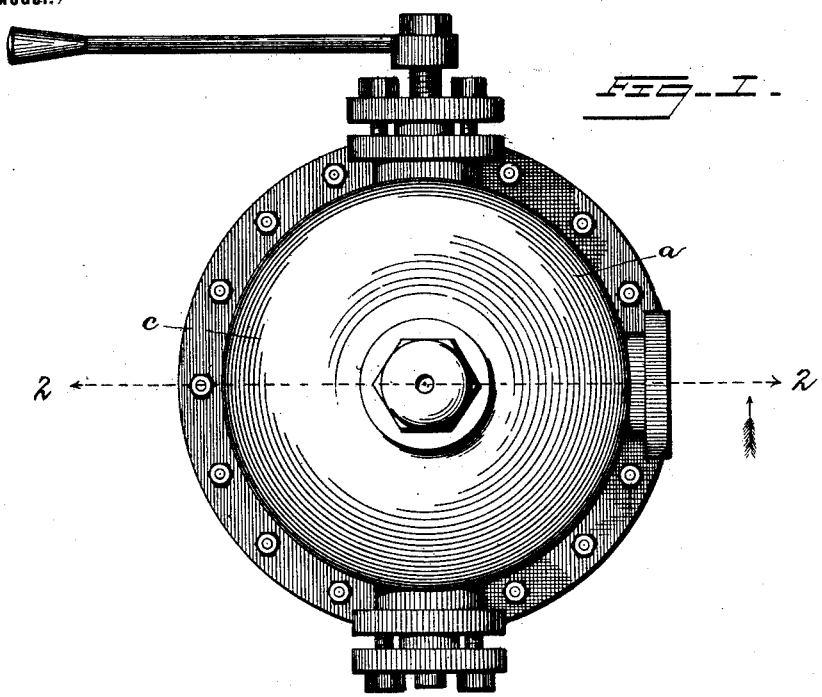
Figure 2:
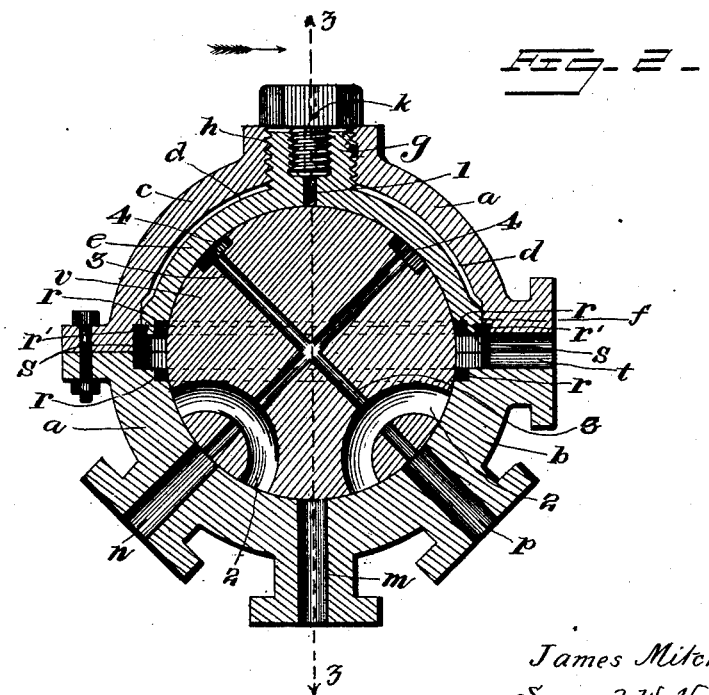

Figure 1 is a top view of the valve. Fig. 2 is a section on the line 2 2, Fig. 1. Fig. 3 is a section on the line 3 3, Fig. 2, showing the spherical valve in elevation.

The invention relates to balanced valves designed chiefly for hydraulic apparatus and other mechanisms where the medium of power is under high pressure; and the invention consists in the novel construction and combinations of devices, as hereinafter set forth.

The object of the invention is to provide a balanced valve of powerful character capable of withstanding great pressure without leakage or other structural defect and yet easily operated.

In the accompanying drawings the letter $a$ designates the valve-case, which is of spherical form and is constructed in two halves, which are bolted together. As shown in the drawings, the lower half $b$ of the shell or case is thicker than the upper half $c$, the latter having an interior recess $d$ of hemispherical form in which is located an interior hemispherical bearing $e$, having a cylindriform margin $f$ of limited extent, but sufficient to afford adjustment. This cylindrical margin is designed to fit neatly the cylindriform lower portion of the hemispherical recess, while the surface of the bearing has a little play within the recess. The bearing is provided with a threaded lug $g$, which engages a threaded opening $h$ in the top of the valve. A check-bolt $k$, engaging this lug, has a broad head to engage the margin of the threaded opening and serves to fix the position of the bearing when properly adjusted. Through the bolt, lug, and bearing extends a central passage $l$.

The lower section of the valve-case is provided with an exhaust-port $m$ at its bottom and on each side thereof with pressure-ports $n$ and $p$ at an angle of about forty-five degrees therefrom, or about midway between such exhaust-port and the equatorial chamber $s$. This chamber is annular, extending around the valve-case and being recessed therein, as indicated. Packing-rings are shown at $r\ r'$. The inlet for the medium of power, water, steam, oil, or air is indicated at $t$ and is an offset of the equatorial chamber.

The valve $v$ is spherical, fitting neatly within the incasement and against the interior of the hemispherical bearing when the latter is properly adjusted. The valve is provided with journals 6 6, which extend through stuffing-boxes $w$ in the sides of the case, and one of said journals is provided with a handle or lever whereby the valve is turned.

In the lower portion of the valve opposite the adjustable bearing, on each side, is formed a curved passage 2, the ends of which open on the spherical surface of the valves in the line of the pressure-ports $n$ and $p$, the inlet, and the exhaust. The lands between the curved passages and between the mouths of each passage are equal in length to each other, and to the lands between the pressure-ports, the exhaust, and the equatorial chamber. In this manner it is designed that the curved passages may be turned to connect either pressure-port with the equatorial chamber or with the exhaust. The equatorial chamber communicates with the inlet and is practically the valve-inlet for the medium of power.

At right angles to each other extend diametrically through the valve the equalizing-passages 3 3, each of which provides a communication between an equalizing-chamber 4 on the upper lateral surface of the valve with a curved passage in the lower lateral portion of the valve. The equalizing-passages 3 3 do not communicate with the equatorial inlet-chamber, but intersect the curved passages 2, passing through the lands thereof to the surface of the valve, so that they communicate with the pressure-ports when the valve is being turned and serve to equalize the pressure on the valve-surface in such a manner that it can be easily operated.

When the front curved passage 2 or passage nearest the inlet is turned to the inlet, the pressure passes to the front pressure-port $p$, the back pressure-port $n$ being at the same time put in communication with the exhaust. When the valve is turned in the opposite direction to bring the other curved passage 2 in position to connect the equatorial inlet-chamber with the back pressure-port, the front pressure-port is put in communication with the exhaust.

The spherical form of the valve-case gives it great strength, and the equalizing devices are so arranged in connection with the spherical valve that it can be easily operated.

Having described this invention, what we claim, and desire to secure by Letters Patent, is—

1. The combination with a spherical valve-case, recessed in its upper portion, of a spherical valve, an equatorial annular inlet-chamber, a hemispherical bearing adjustable in the upper recess of the valve-case, pressure and exhaust ports of the valve-case, and equalizing passages and chambers of said valve, substantially as specified.

2. In a balanced valve, the spherical valve having curved passages in its lower portion, each passage opening by both ends on the surface of said valve, equalizing-chambers on the opposite side of said valve from said curved passages, and equalizing-passages extending diametrically through the valve from such equalizing-chambers and intersecting said curved passages, substantially as specified.

3. A balanced valve, having an annularly-recessed valve-case, a spherical valve journaled in said case, an adjustable hemispherical bearing above said valve, suitable ports of the case and passages of the valve adapted thereto, and means for equalizing pressure, substantially as specified.

4. A balanced valve, being within a spherical case, provided with an equatorial annular inlet-chamber, and pressure and exhaust ports, a spherical valve provided with curved passages adapted to register with such ports, equalizing-chambers opposite such passages, and equalizing-passages extending through the valve from the equalizing-chamber to said curved passages, substantially as specified.

In testimony whereof we affix our signatures in presence of two witnesses.

JAMES MITCHELL.
SAMUEL W. VAUGHEN.

Witnesses:
GEO. E. HALL,
EDNA HALL.